United States Patent [19]

Septier et al.

[11] 4,162,916
[45] Jul. 31, 1979

[54] PROCESS FOR THE TREATMENT OF COMPLEX METAL ORES CONTAINING, IN PARTICULAR, MANGANESE AND COPPER, SUCH AS OCEANIC NODULES

[75] Inventors: Louis Septier; Francis Dubrous; Michel Demange, all of Le Fayet, France

[73] Assignee: Societe Francaise d'Electrometallurgie Sofrem, Paris, France

[21] Appl. No.: 890,524

[22] Filed: Mar. 27, 1978

[30] Foreign Application Priority Data

Apr. 4, 1977 [FR] France .............................. 77 10862

[51] Int. Cl.² ............................................ C22B 47/00
[52] U.S. Cl. ............................................ 75/21; 75/80
[58] Field of Search ........................ 75/21, 23, 24, 80

[56] References Cited

U.S. PATENT DOCUMENTS

| | | | |
|---|---|---|---|
| 3,004,846 | 10/1961 | Queneau | 75/21 |
| 3,753,686 | 8/1973 | Wilder | 75/21 |
| 4,049,438 | 9/1977 | Sridhar | 75/21 |
| 4,073,641 | 2/1978 | Montanteme | 75/21 |

*Primary Examiner*—P. D. Rosenberg
*Attorney, Agent, or Firm*—McDougall, Hersh & Scott

[57] ABSTRACT

The invention relates to a pyrometallurgical process for the treatment of complex metal ores, such as oceanic nodules, containing, in particular, manganese and copper, in which the ores are subjected to reducing fusion to produce a primary slag, containing all the manganese, and a primary alloy containing copper, nickel and cobalt. The primary slag which is then decoppered, may be used for the production of ferro or silicomanganese, while the secondary alloy is recycled for the reducing fusion step.

12 Claims, 1 Drawing Figure

FLOW DIAGRAMS OF THE PROCESS

FLOW DIAGRAMS OF THE PROCESS
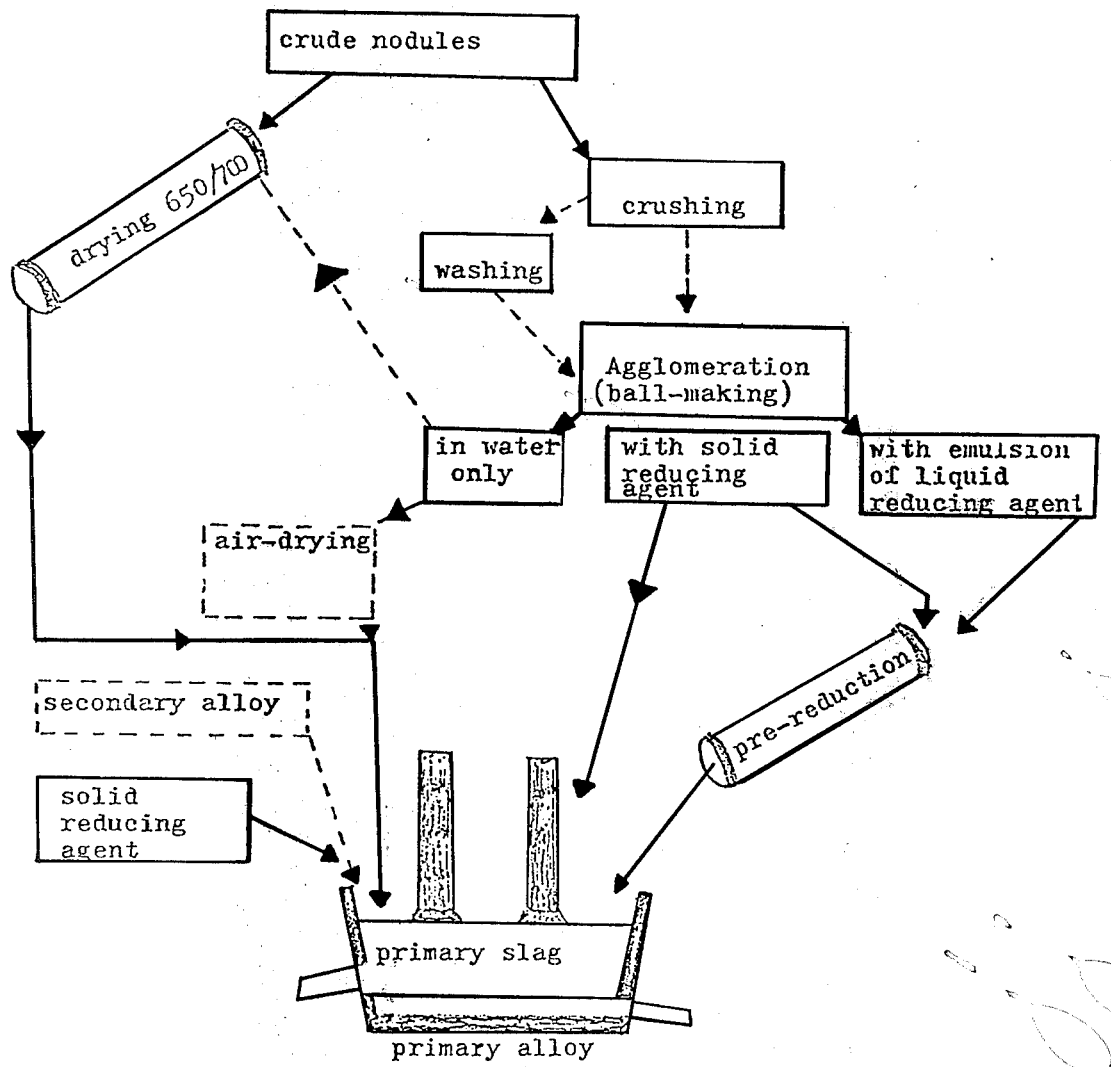

PROCESS FOR THE TREATMENT OF COMPLEX METAL ORES CONTAINING, IN PARTICULAR, MANGANESE AND COPPER, SUCH AS OCEANIC NODULES

This invention relates to a process for treating complex metal ores containing, in particular, manganese and copper and possibly small quantities of other metals such as iron, nickel, cobalt, molybdenum, titanium and aluminum.

It applies particularly to oceanic nodules having a chemical composition which, by way of example, is generally within the following limits in percent by weight:
- Mn: 20 to 50%
- Cu: 0.5 to 1.5%
- Ni: 0.5 to 2%
- Co: 0.1 to 0.5%
- Fe: 5 to 20% and optionally:
- Al: 0.5 to 5%
- Ti: 0.1 to 2%
- Mo: 0.01 to 0.1% and which also contain, in the crude state, lime, silica, magnesium chloride ions, phosphate and sulphate combined with alkali and alkaline earth metals.

Numerous chemical processes have already been proposed for extracting the four principal metals from oceanic nodules, but these are directed mainly toward the recovery of the three metals having the highest commercial value, namely, copper, nickel and cobalt. Manganese is frequently neglected owing to its low price and the relative abundance of deposits thereof.

Pyrometallurgical treatments have also been proposed, in particular in the Kennecot Copper Corporation U.S. Pat. No. 3,957,584. By carrying out reducing fusion of the nodules in the presence of silica, a slag of magnesium silicate, on the one hand, and a liquid metal alloy containing copper, nickel, cobalt, iron and manganese in variable proportions and quantities, depending upon the percentage of reducing agent, on the other hand, are obtained. It is possible to separate the different constituents to a certain extent by fractional crystallization.

However, it is observed that if there is lack of reducing agent, the alloy contains very little manganese (less than 0.20%) but a proportion of the unreduced copper remains in the magnesium silicate slag which is thus completely unavailable for use in the manufacture of manganese alloys (for example silico or ferro-manganese) intended for steel works. As soon as the quantity of reducing agent is increased, however little, a slag having a very low copper content is obtained but the alloy contains a significant quantity of manganese (up to 30%) which reduces its value and makes it much more complicated to separate the "precious" metals (Cu, Ni, Co).

The present invention relates to a process for pyrometallurgical reduction of metal ores, such as oceanic nodules, containing a large quantity of manganese combined with smaller quantities of iron, copper, nickel, cobalt and possibly other metals allowing, on the one hand, almost all of the manganese to be obtained in the form of a slag having a very low copper content and, on the other hand, all of the other metals, and particularly copper, nickel and cobalt in the form of a manganese-free alloy from which they could possibly be separated one from the other by any known process.

The invention is characterized by the preparation of the nodules followed by reducing fusion in an electric furnace, supplying a primary alloy and a primary slag, followed by a treatment of the said primary slag in a ladle by means of a reducing agent, supplying a secondary slag of copper-free manganese and a secondary alloy retaining all of the copper which is recycled into the electric reduction furnace where it ensures, in part, that the reducing agent functions.

The preparation of the nodules, which constitutes the first phase of the process according to the invention, may be carried out by various means.

In the first variation, the oceanic nodules, which contain between 10 and 40% of water in the crude state, are dried by a conventional process at a temperature of at least 500° C. and, preferably, at least 650° C., then introduced into an arc-melting furnace with the required quantity of solid reducing agent.

In a second variation, the nodules are crushed, washed if necessary to eliminate the majority of the soluble impurities and particularly the alkaline chlorides which may produce undesirable fumes during fusion, and are then agglomerated by the conventional ball-making technique. At this stage, it is possible to carry out the process described in French Pat. No. 2,262,119, entitled "An improvement to the selective reduction of oxidized metal ores", which involves introducing the reducing agent, accurately dosed, at the time at which the balls are made, either in the form of a solid carbon product mixed with the crushed nodules, or by using a water emulsion and a liquid hydrocarbon as liquid additives for ball-making.

Once the nodules have been simply crushed and reagglomerated in pellets, the first variation is adopted and the pellets are charged into the arc-melting furnace with the required quantity of solid reducing agent.

Once the nodules have been made into pellets with addition of liquid or solid reducing agent, it may be more advantageous to carry out pre-reduction in a furnace heated, for example, by fuel oil or natural gas and to charge the pre-reduced nodules into the arc-melting furnace where reduction is completed.

The choice between the various methods shown diagrammatically in FIG. 1 depends upon the local economic conditions and, in particular, the respective prices and availability of electrical energy and hydrocarbons.

Generally speaking, it is preferable to use carbon reducing agents having a low sulphur content especially if the sulphur content of the metal produced is to be kept to a minimum. On the other hand, attempts could be made in certain cases to form mats.

Regardless of the method adopted for the preparation of the nodules, reducing fusion, which is the second phase of the process according to the invention, is performed in an arc-melting furnace, with addition, if necessary, of the reducing agent if it has not been previously incorporated in the nodules or pellets. The quantity of reducing agent is calculated, taking into consideration its reduction rate which may vary depending upon whether cokes, coal or anthracites or wood charcoal are used, so that the total amount of nickel and cobalt, the majority of the copper and about one third of the iron ore reduced. If the quantity of reducing agent is too small, a proportion of the "precious" metals and particularly copper remain in the slag. If there is an excess of reducing agent, the manganese is reduced to dilute the Ni-Cu-Co alloy, thus making it more difficult and more expensive for subsequent use.

When calculating the quantity of reducing agent, it is also necessary to take into consideration the fact that a "secondary alloy", containing, in addition to the copper, nickel and cobalt, significant quantities of manganese and a little silicon which are reducing agents for nickel, copper and cobalt oxides, is recycled in the arc-melting furnace. As will be seen later on, this causes the quantity of carbon reducing agent to be reduced somewhat.

The average composition of the nodules is such that a relatively fluid slag is obtained which has a melting point of between 1350° and 1500° C. The composition may be modified by different additions such as silica, lime and magnesium, but in practice this has not turned out to be necessary with the nodules presently available. Things might be different with types of terrestrial nodules or ores of different composition.

Upon completion of fusion, a primary alloy containing almost all of the nickel, cobalt and about three quarters of the copper and about one third of the iron, an insignificant quantity of manganese and possibly molybdenum, on the one hand, and a primary slag containing almost all of the manganese, the other two thirds of the iron, about a quarter of the copper, small quantities of nickel and cobalt and possibly aluminum and titanium as well as the acidic oxides ($SiO_2$) and basic oxides (CaO, MnO, $Al_2O_3$ optionally alkaline) initially present in the nodules or optionally added during fusion, on the other hand, are obtained.

The metal and the slag are separated by conventional electrometallurgical techniques, for example by providing two casting orifices into the melting furnace, one at the level of the slag and the other at the level of the metal. The metal can only be extracted after several successive operations owing to its small volume in relation to the slag.

The third stage of the process according to the invention, the main aim of which is to decopper the primary slag, involves treating the slag with a silicon-based reducing agent, for example ferrosilicon containing 75% of silicon. The operation is preferably carried out in a ladle in which the primary slag is cast or even in two successive ladles, if mixing is to be carried out to promote the reaction.

After this stage, on the one hand, a secondary alloy containing all of the copper, nickel and cobalt in the primary slag as well as manganese and iron and possibly silicon is obtained, and on the other hand, a secondary slag essentially containing manganese and iron as well as the acidic and basic oxides and traces of nickel and copper is obtained.

This slag may therefore be used for the production of silica or ferromanganese by a known electrometallurgical process, either by using it immediately in liquid form, or by casting it into ingot molds for later use.

The secondary alloy which, owing to its manganese content, has a reducing power towards the nickel and cobalt oxides, is subsequently reintroduced into the arc-melting furnace thus allowing the required quantity of carbon reducing agent to be diminished somewhat and allowing the copper, nickel and cobalt to be recycled.

EXAMPLE 1

100 kg of oceanic nodules previously dried at 700° C. and having the following composition in percent by weight were treated:
Mn: 32.5%
Fe: 11.5%
Ni: 1.5%
Cu: 0.9%
Co: 0.25%

The nodules were melted in a 100 KVA arc-melting furnace with 5 kg of petroleem coke having a low sulphur content and 5.5 kg of secondary alloy emanating from a previous operation. After fusion on the one hand, 7 kg of primary alloy having the following composition was obtained:
Ni: 23% corresponding to a reduction rate of 98.3%
Co: 3.7% corresponding to a reduction rate of 96.5%
Cu: 12% corresponding to a reduction rate of 77.5%
Fe: 60.8% corresponding to a reduction rate of 36.4%
C: 0.35%
Mn: 0.11% corresponding to a reduction rate of 0.025% and, on the other hand, 83 kg of primary slag which has been cast in a ladle with addition of 1.35 kg of ferrosilicon containing 75% of silicon. After the reaction, 5.5 kg of secondary alloy was obtained on the one hand, having the following composition in percent by weight:
Cu: 4%
Ni: 0.6%
Co: 0.16%
Mn: 15%
Si: 1%
Fe: remainder and, on the other hand, 78 kg of secondary slag having the composition in weight percent of:
MnO: 44%
FeO: 11.6%
Cu: 300 ppm
Ni: 200 ppm
$SiO_2$: 25%
CaO+MgO+div: about 20%
which could be used directly for the production of ferro and silicomanganese.

EXAMPLE 2

123 kg of crude nodules (equivalent to 100 kg of nodules dried at 700° C.), having the same composition as in Example 1, were crushed so as to pass completely through a standardized 0.1 mm mesh sieve, were agglomerated on a ball-making plate supplied with a water emulsion and light fuel oil having a low sulphur content (in a proportion of 1.2 liters of fuel oil per 10 liters of water). The pellets were introduced into a rotary furnace where drying and then pre-reduction took place. The pellets were immediately charged into a 100 KVA arc-melting furnace without addition of reducing agent. 5.5 kg of secondary alloy emanating from a previous operation were added towards the end of fusion.

Whereas 113 KVA were required for fusion in Example 1, only 101 were required in this case.

The succession of operations was the same as in Example 1 and the results and the composition of the primary and secondary slags and alloys were practically identical.

The process of this invention has application not only to oceanic nodules but quite generally to all types of ores in which nickel, copper and cobalt coexist with a much larger quantity of manganese and iron, when nickel, copper and manganese-free cobalt, on the one hand, and copper-free manganese, on the other hand, are to be recovered separately.

We claim:

1. A process for the pyrometallurgical treatment of complex metal ores, which contains, in addition to manganese and iron, small quantities of nickel, cobalt and copper in amounts up to a total of 4% by weight, comprising treating the ore by fusion in an electric arc furnace in the presence of a reducing agent to produce a primary slag containing manganese, some of the copper and some of the iron and a primary alloy containing nickel, cobalt, most of the copper and some of the iron, separating the primary slag from the primary alloy, subjecting the primary slag to the action of a reducing agent to produce a secondary slag of copper-free manganese oxide and a secondary alloy containing the remaining copper and iron.

2. A process for the pyrometallurgical treatment of metal ores as claimed in claim 1, in which the reducing agent used for the treatment of the primary slag is ferrosilicon.

3. A process for the pyrometallurgical treatment of metal ores as claimed in claim 1, which includes the step of recycling the secondary alloy to the step for treatment of the ore by fusion in the presence of a reducing agent.

4. A process for the pyrometallurgical treatment of metal ores as claimed in claim 1, in which the complex metal ores subjected to treatment comprises oceanic nodules previously dried at a temperature of at least 500° C.

5. A process as claimed in claim 4, in which the oceanic nodules are dried at a temperature of at least 650° C.

6. A process for the pyrometallurgical treatment of metal ores as claimed in claim 1, in which the complex metal ore is previously crushed oceanic nodules.

7. A process for the pyrometallurgical treatment of metal ores as claimed in claim 6, which includes the step of washing the crushed nodules in water so as to eliminate the majority of the soluble impurities.

8. The process as claimed in claim 7, in which the soluble impurities eliminated include alkaline chlorides.

9. A process for the pyrometallurgical treatment of metal ores as claimed in claim 6, which includes the step of agglomerating the crushed nodules into balls.

10. A process for the pyrometallurgical treatment of metal ores as claimed in claim 9, in which the quantity of reducing agent required for reduction is incorporated during ball-making.

11. A process for pyrometallurgical treatment as claimed in claim 10, in which the reducing agent is a pulverized solid carbon product.

12. A process for the pyrometallurgical treatment of metal ores as claimed in claim 10, in which the reducing agent is a liquid hydrocarbon which is emulsified with water and in that the emulsion thus produced is used for agglomerating.

* * * * *

UNITED STATES PATENT OFFICE
CERTIFICATE OF CORRECTION

Patent No. 4,162,916        Dated July 31, 1979

Inventor(s) Louis Septier, Francis Dubrous & Michel Demange

It is certified that error appears in the above-identified patent and that said Letters Patent are hereby corrected as shown below:

Col. 2, line 66 cancel "ore" and substitute -- are --

Col. 3, line 1 after "reduced" insert -- needlessly --

Signed and Sealed this

Twentieth Day of November 1979

[SEAL]

Attest:

RUTH C. MASON
Attesting Officer

LUTRELLE F. PARKER
Acting Commissioner of Patents and Trademarks